United States Patent
Yokoyama et al.

(10) Patent No.: US 8,436,081 B2
(45) Date of Patent: *May 7, 2013

(54) HIGH FILM BUILD COATING COMPOSITION CONTAINING LOW MOLECULAR WEIGHT POLYTRIMETHYLENE ETHER GLYCOL

(75) Inventors: Ayumu Yokoyama, Wallingford, PA (US); Hari Babu Sunkara, Hockessin, DE (US); Rajesh Gopalan Saliya, Media, PA (US)

(73) Assignee: U.S. Coatings IP Co. LLC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,048

(22) Filed: Mar. 14, 2011

(65) Prior Publication Data

US 2012/0053274 A1 Mar. 1, 2012

Related U.S. Application Data

(60) Provisional application No. 61/378,653, filed on Aug. 31, 2010.

(51) Int. Cl.
*C08K 5/21* (2006.01)
*C09D 175/14* (2006.01)

(52) U.S. Cl.
USPC .......................... 524/196; 524/212

(58) Field of Classification Search .................. 524/196, 524/212
See application file for complete search history.

(56) References Cited

U.S. PATENT DOCUMENTS

| | | | |
|---|---|---|---|
| 4,311,622 A * | 1/1982 | Buter | 524/542 |
| 4,659,780 A | 4/1987 | Stamegna et al. | |
| 4,677,028 A | 6/1987 | Heeringa et al. | |
| 5,122,522 A | 6/1992 | Laties et al. | |
| 5,633,362 A | 5/1997 | Nagarajan et al. | |
| 5,686,276 A | 11/1997 | Laffend et al. | |
| 5,821,092 A | 10/1998 | Nagarajan et al. | |
| 6,221,494 B1 | 4/2001 | Barsotti et al. | |
| 6,608,168 B1 | 8/2003 | Ng | |
| 6,720,459 B2 | 4/2004 | Sunkara et al. | |
| 6,875,514 B2 | 4/2005 | Sormani et al. | |
| 6,977,291 B2 | 12/2005 | Sunkara et al. | |
| 7,169,475 B2 | 1/2007 | Sormani et al. | |
| 7,268,182 B2 * | 9/2007 | Sunkara et al. | 524/589 |
| 7,728,175 B1 | 6/2010 | Qi et al. | |
| 2004/0007043 A1 * | 1/2004 | Matsuoka | 72/452.9 |
| 2004/0030095 A1 | 2/2004 | Sunkara et al. | |
| 2004/0185263 A1 * | 9/2004 | Sormani et al. | 428/422.8 |
| 2004/0249061 A1 * | 12/2004 | Sunkara et al. | 524/589 |
| 2007/0190257 A1 * | 8/2007 | Huynh-Ba et al. | 427/407.1 |
| 2010/0004365 A1 | 1/2010 | Saliya et al. | |

* cited by examiner

*Primary Examiner* — John Uselding
(74) *Attorney, Agent, or Firm* — Gann Xu

(57) ABSTRACT

The present disclosure is directed to a high film build coating composition that is capable of producing coatings being sag-free at high coating thicknesses and good appearance. This disclosure is further directed to a coating composition comprising components derived from renewable resources.

14 Claims, No Drawings

HIGH FILM BUILD COATING COMPOSITION CONTAINING LOW MOLECULAR WEIGHT POLYTRIMETHYLENE ETHER GLYCOL

FIELD OF DISCLOSURE

The present disclosure is directed to a high film build coating composition. This disclosure is particularly directed to a coating composition comprising components derived from renewable resources.

BACKGROUND OF DISCLOSURE

A typical coating finish over a substrate comprises some or all of the following layers: (1) one or more primer layers that provide adhesion and basic protection, and also cover minor surface unevenness of the substrate; (2) one or more colored layers, typically pigmented, that provide most of the protection, durability and color; and (3) one or more clearcoat layers that provide additional durability and improved appearance. A colored topcoat layer can be used in place of the colored layer and clearcoat layer.

In some industrial applications, such as coating metal pipes, trucks, large industrial equipments, and large entertainment equipments, it is often desired to complete the coating process in a short period of time while still achieving good adhesion, protection, durability and appearance. Conventional coating compositions for colored layers are often less optimized for good adhesion directly to metals. In addition, a conventional coating composition typically produces a thin cured dry coating layer that may not have sufficient thickness to cover unevenness of the substrate if only a single layer is used. That could result in undesired appearance. When conventional coatings are applied at a high coating thickness, surface coating defects such as microfoaming, low gloss, and sagging may occur. Thick coating layers are typically prone to sagging defects, especially for coating layers applied on vertical surfaces.

There are continued needs for new coating compositions.

STATEMENT OF DISCLOSURE

This disclosure is directed to a coating composition comprising a binder consisting essentially of:
A) a crosslinkable component consisting essentially a polymer having one or more crosslinkable functional groups;
B) a polytrimethylene ether glycol having a Mn (number average molecular weight) in a range of from 134 to 490;
C) a sag control agent; and
D) a crosslinking component consisting essentially of at least one crosslinking agent having one or more crosslinking functional groups.

This disclosure is also directed to a substrate coated with the coating composition of this invention.

This disclosure is further directed to a process for forming a sag-free coating layer on a substrate, said process consisting of the steps of:
i) applying the coating composition of this invention over the substrate forming a sag-free wet coating layer having a wet coating thickness in a range of from 10 to 36 mils; and
ii) curing said sag-free wet coating layer to form said sag-free coating layer.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

"Gloss" means surface gloss of a coating surface and is related to the amount of incident light that is reflected at the specular reflectance angle of the mean of that surface. Gloss can be measured with a specular glossmeter, such as those available from Byk-Gardener, Geretsried, Germany.

"DOI" (Distinctness of Image) is a quantitative measure of coating appearance that measures the light reflected at and around the specular reflectance angle. It can be determined according to the method described in ASTM D 5767. DOI can be measured with wave scan instruments, such as those available from Byk-Gardener, Geretsried, Germany. DOI measures not only the amount of incident light that is reflected at the specular reflectance angle, but also the distribution of the reflected light around the reflectance specular angle, typically +/−0.3° from the specular angle. A coating surface that gives fuzzy or distorted image generally produces lower DOI reading. A coating reflecting 100% of lights at the specular angle gives a DOI reading of 100.

The term "sag" or "sagging" refers to coating defects such as dropping line, sagging curtains, tearing drops, or other defects and variations in coating that cause the coating to be un-smooth. The term "sag-free" or "free of sagging" or "free of sag" means a coating that is free of sagging defects. It is known to those skilled in the art that a thick wet coating layer tends to form sagging defects.

The term "a coating layer" or "a single coating layer" means a layer of coating formed after curing or drying of a wet coating layer of one coating composition. Such single wet coating layer can be formed by any conventional coating application methods known to those skilled in the art, such as spraying, brushing, dipping, rolling, or wet draw down.

The term "(meth)acrylate" means methacrylate or acrylate.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, adhesion, high gloss, and high DOI.

The term "one-pack coating composition", also known as 1K coating composition, refers to a coating composition having one package that are stored in one container and sealed to increase the shelf life of the coating composition during storage. The 1K coating composition can be formulated to be cured at certain curing conditions. Examples of such curing conditions can include: radiation, such as UV radiation including UV-A, UV-B, and UV-C radiations, electron beam (e-beam) radiation, infrared (IR) radiation, or lights in visible or invisible wavelengths; moisture, such as water accessible to the coating composition; heat energy, such as high temperatures; or other chemical or physical conditions.

The term "crosslinkable component" refers to a component having "crosslinkable functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide or a workable combination thereof.

It would be clear to one of ordinary skill in the art that certain crosslinking functional groups crosslink with certain crosslinkable functional groups. Examples of paired combinations of crosslinkable and crosslinking functional groups can include: (1) amine and protected amine such as ketimine and aldimine functional groups generally crosslink with acetoacetoxy, epoxy, or anhydride functional groups; (2) isocyanate, thioisocyanate and melamine functional groups generally crosslink with hydroxyl, thiol, primary and secondary amine, ketimine, or aldimine functional groups; (3) epoxy functional groups generally crosslink with carboxyl, primary and secondary amine, ketimine, aldimine or anhydride functional groups; and (4) carboxyl functional groups generally crosslink with epoxy or isocyanate functional groups.

The term "binder" as used herein refers to film forming constituents of a coating composition. Typically, a binder can comprise a crosslinkable component and a crosslinking component in that the crosslinkable component can react with the crosslinking component to form crosslinked structures, such as coating films. The binder in this invention can further comprise other polymers, compounds or molecules that are essential for forming crosslinked coatings having desired properties, such as good adhesion, high DOI and free of sagging at high coating thicknesses. Additional components, such as solvents, pigments, catalysts, rheology modifiers, antioxidants, UV stabilizers and absorbers, leveling agents, antifoaming agents, anti-cratering agents, or other conventional additives are not included in the term. One or more of those additional components can be included in the coating composition of this invention.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

This disclosure is directed to a coating composition. The coating composition can comprise a film forming binder, herein referred to as the "binder". The binder can consist essentially of:

A) a crosslinkable component consisting essentially of at least one acrylic polymer having one or more crosslinkable functional groups;

B) a polytrimethylene ether glycol having a Mn (number average molecular weight) in a range of from 134 to 490;

C) a sag control agent; and

D) a crosslinking component consisting essentially of at least one crosslinking agent having one or more crosslinking functional groups.

The coating composition of this invention can be applied over a substrate with conventional coating methods known to those skilled in the art to form a sag-free coating layer. The sag-free coating layer can have a wet thickness of more than 10 mils (about 0.25 mm), preferred more than 12 mils (about 0.30 mm) and further preferred more than 16 mils (about 0.40 mm). Once cured and dried, the sag-free coating layer can have a dry coating thickness of more than 6 mils (about 0.15 mm) and a distinctness of image (DOI) of more than 60. In one embodiment, the dry coating thickness can be more than 6 mils (about 0.15 mm). In another embodiment, the dry coating thickness can be more than 7 mils (about 0.17 mm). In yet another embodiment, the DOI can be more than 60. In another embodiment, the DOI can be more than 70. In yet another embodiment, the DOI can be more than 80.

The polymer can be selected from acrylic polymers, polyester polymers, polyesterurethanes, polyetherurethanes, poly (meth)acrylamides, polyepoxides, polycarbonates, or a combination thereof. The polymers can have one or more crosslinkable functional groups that can be selected from hydroxyl groups, carboxyl groups, glycidyl groups, amino groups, silane groups, or a combination thereof. The one or more functional groups can be from monomers that are used to produce the polymer, or be added to or modified on the polymer after polymerization. When more than one polymer is present in the coating composition, the crosslinkable functional groups can be on one or more of the polymers. In one example, the coating composition can comprise acrylic polymers. In another example, the coating composition can comprise polyesters. In yet another example, the coating composition can comprise acrylic polymers and polyesters. The crosslinkable functional groups can be on the acrylic polymers or on the polyesters or both. At least one of the one or more crosslinkable functional groups can be a hydroxyl group, and at least one of the one or more crosslinking functional groups can be an isocyanate group.

The acrylic polymer can have a weight average molecular weight (Mw) of about 1,000 to 100,000 and can contain functional groups or pendant moieties such as, for example, hydroxyl, amino, amide, glycidyl, silane and carboxyl groups. These acrylic polymers can be straight chain polymers or copolymers, branched polymers or copolymers, block copolymers or copolymers, graft polymers or copolymers. In one example, the one or more crosslinkable functional groups can be selected from hydroxyl groups, carboxyl groups, glycidyl groups, amino groups, silane groups, or a workable combination thereof.

The acrylic polymers can be polymerized from a plurality of monomers, such as acrylates, methacrylates, or derivatives thereof, or any monomers suitable for acrylic polymers that are known to or developed by those skilled in the art. One or more of the monomers can have the functional groups or pendant moieties selected from hydroxyl groups, carboxyl groups, glycidyl groups, amino groups, silane groups, or a workable combination thereof.

Examples of suitable monomers can include linear alkyl (meth)acrylates having 1 to 12 carbon atoms in the alkyl group, cyclic or branched alkyl(meth)acrylates having 3 to 12 carbon atoms in the alkyl group, including isobornyl(meth) acrylate, styrene, alpha methyl styrene, vinyl toluene, (meth) acrylonitrile, (meth)acryl amides and monomers that have crosslinkable functional groups. Examples of monomers having crosslinkable functional groups can include, hydroxy alkyl(meth)acrylates having 1 to 4 carbon atoms in the alkyl group, glycidyl(meth)acrylate, amino alkyl(meth)acrylates having 1 to 4 carbon atoms in the alkyl group, (meth)acrylic acid, and alkoxy silyl alkyl(meth)acrylates, such as, trimethoxysilylpropyl(meth)acrylate, or derivatives or reaction products therefrom.

Further suitable unsaturated monomers that do not contain additional functional groups can include, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers can include styrene, alpha-methylstyrene, chlorostyrenes, 2,5-dimethylstyrene, p-methoxystyrene, and vinyl toluene.

The acrylic polymers of this disclosure can generally be polymerized by free-radical copolymerization using conventional processes well known to those skilled in the art, for example, bulk, solution or bead polymerization, in particular by free-radical solution polymerization using free-radical initiators.

The acrylic polymer can contain (meth)acrylamides. Typical examples of such acrylic polymers can be polymerized from monomers including (meth)acrylamide. In one example, such acrylic polymer can be polymerized from (meth)acrylamide and alkyl(meth)acrylates, hydroxy alkyl (meth)acrylates, (meth)acrylic acid and one of the aforementioned olefinically unsaturated monomers.

In one example, the acrylic polymer can be polymerized from monomers selected from the group consisting of styrene, n-butyl acrylate, ethyl methacrylate, methyl methacrylate, butyl acrylate, 2-ethylhexyl acrylate, ethyl acrylate, isobutyl acrylate, 2-ethylhexyl methacrylate, 2-hydroxyethyl acrylate, hydroxypropyl acylate, and a combination thereof.

In another example, the acrylic polymer can be polymerized from monomers selected from the group consisting of styrene, ethylhexyl methacrylate, n-butyl acrylate, ethyl methacrylate, methyl methacrylate, hydroxyethyl methacrylate, and a combination thereof.

Acrylourethanes also can be used to form the novel coating composition of this invention. Typical useful acrylourethanes are formed by reacting the aforementioned acrylic polymers with an organic polyisocyanate. Generally, an excess of the acrylic polymer is used so that the resulting acrylourethane has terminal acrylic segments having reactive groups as described above. These acrylourethanes can have reactive end groups and/or pendant groups such as hydroxyl, carboxyl, amine, glycidyl, amide, silane or mixtures of such groups. Useful organic polyisocyanates are described hereinafter as the crosslinking component but also can be used to form acrylourethanes useful in this invention. Typically useful acrylourethanes are disclosed in Stamegna et al. U.S. Pat. No. 4,659,780.

The polyester polymers can be saturated or unsaturated and optionally, may be modified with fatty acids. The polyester polymers can be the esterification product of one or more polyhydric alcohols, such as, alkylene diols and glycols; monocarboxylic acids and a polycarboxylic acids or anhydrides thereof, such as, dicarboxylic and/or tricarboxylic acids or tricarboxylic acid anhydrides. The polyester polymers can have one or more aforementioned crosslinkable functional groups.

Examples of polyhydric alcohols used to form the polyester include triols and tetraols, such as, trimethylol propane, triethylol propane, trimethylol ethane, glycerine, and dihydric alcohols and diols that include ethylene glycol, propylene glycol, 1,3-propanediol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexane dimethanol, hydrogenated bisphenols A and F, Esterdiol 204 (Trademark of Union Carbide) and highly functional polyols, such as, trimethylolethane, trimethylolpropane, and pentaerythritol. Polyhydric alcohols having carboxyl groups may be used, such as, dimethylol propionic acid (DMPA).

Typical acids and anhydrides that can be used to form the polyester can include aliphatic or aromatic carboxylic acids and anhydrides thereof, such as, adipic acid, azelaic acid, sebacic acid, dimerized fatty acids, maleic acid, maleic anhydride, succinic acid, succinic anhydride, isophthalic acid, terephthalic acid, phthalic acid, phthalic anhydride, dimethyl terephthalic acid, naphthalene dicarboxylic acid, tetrahydro- and hexahydrophthalic anhydride, tetrachlorophthalic acid, terephthalic acid bisglycol ester, benzophenone dicarboxylic acid, trimellitic acid and trimellitic anhydride.

One example of polyester polymer can be the esterification product of monomers selected from the group consisting of neopentyl glycol, trimethylol propane, 1,6 hexane diol, adipic acid, isophthalic acid and trimellitic anhydride.

Commercially available polyester polymers can be suitable. One example of the commercially available polyester polymer can include Desmophen® 1300X from Bayer, Pittsburgh, Pa., USA, under registered trademark.

The polyesterurethanes can be formed by reacting the aforementioned polyesters with an organic polyisocyanate. Generally, an excess of the polyester is used so that the resulting polyesterurethane has terminal polyester segments having reactive hydroxyl groups. Carboxy functional polyesterurethanes can also be used. Useful organic polyisocyanates are described hereinafter as the crosslinking component but can be used to form polyesterurethanes useful in this invention. Examples of useful coating compositions that utilize polyesterurethanes can include those disclosed in U.S. Pat. No. 5,122,522.

The polycarbonates can be esters of carbonic acid which are obtained by the reaction of carbonic acid derivatives, e.g., diphenyl carbonate or phosgene with polyols, preferably diols. Suitable diols are any of those mentioned above.

The polyetherurethanes can be the reaction product of a polyetherpolyol and an organic polyisocyanate.

The polyepoxides can be poly epoxy hydroxy ether resins having 1,2-epoxy equivalency of about two or more, that is, polyepoxides that have on an average basis two or more epoxy groups per molecule. Examples of polyepoxides can include polyglycidyl ethers of cyclic polyols, such as polyglycidyl ethers of ployhydric phenols, such as, bisphenol A or bisphenol F. Such polyepoxides can be produced by the etherification of polyhydric phenols with epihalohydrin or dihalohydrin, such as, epichlorohydrin or dichlorohydrin in the presence of alkali. Examples of useful polyhydric phenols can include 2,bis-(4-hydroxyphenyl)ethane, 2-methyl-1,1-bis-(4-hydroxyphenyl)propane and the like. Besides polyhydric phenols, other cyclic polyols can also be used to prepare the polyglycidyl ethers, such as, alicyclic phenols, particularly, cycloaliphatic polyols, and hydrogenated bisphenol A.

The polyepoxides can be chain extended with polyether or polyester polyols, such as, polycaprolactone diols and with ethoxylated bisphenol A.

The poly(meth)acrylamides can be, such as, polymers of (meth)acrylamide and alkyl(meth)acrylates, hydroxy alkyl (meth)acrylates, (meth)acrylic acid and or one of the aforementioned ethylenically unsaturated polymerizable monomers.

The polytrimethylene ether glycol can be prepared by an acid-catalyzed polycondensation of 1,3-propanediol (herein referred to as "PDO"), such as described in U.S. Pat. Nos. 6,977,291 and 6,720,459. The polytrimethylene ether glycol can also be prepared by a ring opening polymerization of a cyclic ether, oxetane, such as described in J. Polymer Sci., Polymer Chemistry Ed. 23, 429 to 444 (1985). The polycondensation of 1,3-propanediol is preferred over the use of oxetane since the diol is a less hazardous, stable, low cost, commercially available material and can be prepared by use of petro chemical feed-stocks or renewable resources.

A bio-route via fermentation of a renewable resource can be used to obtain the 1,3-propanediol (PDO). One example of renewable resources is corn since it is readily available and has a high rate of conversion to 1,3-propanediol and can be genetically modified to improve yields to the 1,3-propanediol. Examples of typical bio-route can include those described in U.S. Pat. Nos. 5,686,276, 5,633,362 and 5,821,092. The 1,3-propanediol obtained from the renewable source and the coating compositions therefrom can be distinguished from their petrochemical derived counterparts on the basis of radiocarbon dating such as fraction of modern carbon (fM), also know as $^{14}C(fM)$ and dual carbon-isotopic fingerprinting $^{13}C/^{12}C$ such as the one known as $\delta^{13}C$. The fraction of modern carbon fM is defined by National Institute of Standards and Technology (NIST) Standard Reference Materials (RFMs) 4990B and 4990C.

The polytrimethylene ether glycol can have a Mn in a range of from 134 to 650. In one example, the polytrimethylene ether glycol can have a Mn in a range of from 134 to 490. In another example, the polytrimethylene ether glycol can have a Mn in a range of from 200 to 400. In yet another example, the polytrimethylene ether glycol can have a Mn in a range of from 250 to 490. The polytrimethylene ether glycol suitable for this disclosure need to be within the aforementioned range of Mn that can be controlled by polymerization process to have polymers with desired range of Mn, fractionation of polymers to obtain polymers having desired range of Mn, or a combination thereof. The polymerization can be controlled, for example by polymerization timing, reaction temperature, reaction pressure, or a combination thereof, to produce polymers having Mn within the aforementioned Mn range. The polytrimethylene ether glycol can be fractionated or unfractionated. In one example, the fractionated polytrimethylene ether glycol can have PDO monomers, dimers, trimer, tetramers, and pentamers. In another example, the fractionated polytrimethylene ether glycol can have dimers, trimer, tetramers, and pentamers. In yet another example, the fractionated polytrimethylene ether glycol can have trimer, tetramers, pentamers and heamers. In further example, the fractionated polytrimethylene ether glycol can have tetramers, pentamers, heamers and heptamers. In one example, the unfractionated polytrimethylene ether glycol can have, such as, PDO monomers, dimers, trimers, tetramers, pentamers, heamers and heptamers.

The polytrimethylene ether glycol can have in a range of from 10% to 100% of dimers, percentage based on the total weight of the polytrimethylene ether glycol. The polytrimethylene ether glycol can have in a range of from 20% to 100% of dimers in an example, in a range of from 30% to 100% of dimers in another example, in a range of from 40% to 100% of dimers in another example, and in a range of from 50% to 100% of dimers in a yet further example, all percentage based on the total weight of the polytrimethylene ether glycol.

The polytrimethylene ether glycol can include copolymers of polytrimethylene ether glycol that can also be suitable for the coating composition of this disclosure. Examples of such suitable copolymers of polytrimethylene ether glycol can be prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol. In one example, the copolymers of polytrimethylene ether glycol can be polymerized from monomers have 1,3-propanediol in a range of from 50% to 99%. In another example, the copolymers of polytrimethylene ether glycol can be polymerized from monomers have 1,3-propanediol in a range of from 60% to 99%. In yet another example, the copolymers of polytrimethylene ether glycol can be polymerized from monomers have 1,3-propanediol in a range of from 70% to 99%.

One example of copolymers of poytrimethylene ether glycol can be poly(trimethylene-ethylene ether) glycol such as disclosed in US2004/0030095A1. The poly(trimethylene-co-ethylene ether) glycols can be prepared by acid catalyzed polycondensation of in a range of from 50 to 99 mole %

(preferably in a range of from 60 to 98 mole %, and more preferably in a range of from 70 to 98 mole %) 1,3-propanediol and in a range of from 50 to 1 mole % (preferably in a range of from 40 to 2 mole %, and more preferably in a range of from 30 to 2 mole %) ethylene glycol.

The polytrimethylene ether glycol useful in the compositions and methods disclosed herein can contain small amounts of other repeat units, for example, from aliphatic or aromatic diacids or diesters, such as disclosed in U.S. Pat. No. 6,608,168. This type of trimethylene ether glycol oligomer can also be called a "random polytrimethylene ether ester", and can be prepared by polycondensation of 1,3-propanediol reactant and about 10 to about 0.1 mole % of aliphatic or aromatic diacid or esters thereof, such as terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof, and dimethyl terephthalate, bibenzoate, isophthlate, naphthalate and phthalate; and combinations thereof. Of these, terephthalic acid, dimethyl terephthalate and dimethyl isophthalate are preferred.

The polytrimethylene ether polymers with functional groups other than hydroxyls end groups can also be used. Examples of polytrimethylene ether glycol oligomers with amine and ester end functional groups can include those disclosed in U.S. Pat. No. 7,728,175.

A blend of polytrimethylene ether glycol having different molecular weights can be used. Blends of the polytrimethylene ether glycol and other cycloaliphatic hydroxyl containing either branched or linear oligomers can be used. Such hydroxyl containing oligomers are known to those skilled in the art. Examples of such hydroxyl containing oligomers can include those disclosed by Barsotti, et al. in U.S. Pat. No. 6,221,494.

The one or more crosslinking functional groups can comprise isocyanate group. The crosslinking agent can be selected from aliphatic polyisocyanates, cycloaliphatic polyisocyanates, aromatic polyisocyanates, trifunctional isocyanates, isocyanate adducts, or a combination thereof. The crosslinking agent can also be selected from isophorone diisocyanate, toluene diisocyanate, hexamethylene diisocyanate, diphenylmethane diisocyanate, triphenyl triisocyanate, benzene triisocyanate, toluene triisocyanate, the trimer of hexamethylene diisocyanate, or a combination thereof.

Further examples of suitable aliphatic, cycloaliphatic and aromatic polyisocyanates can include: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate,("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation under the registered trademark and the trimer of isophorone diisocyanate can also be suitable.

Other suitable crosslinking components can include melamine formaldehyde, benzoguanamine formaldehyde, and urea formaldehyde.

A silane crosslinking component also can be suitable. One example of silane crosslinking component can be an aminofunctional silane crosslinking agent. Examples of suitable aminofunctional silanes can include aminomethyltriethoxysilane, gamma-aminopropyltrimethoxysilane, gamma-aminopropyltriethoxysilane, gamma-aminopropylmethyldiethoxysilane, gamma-aminopropylethyldiethoxysilane, gamma-aminopropylphenyldiethoxyysilane, N-beta(aminoethyl)gamma-aminopropyltrimethoxysilane, delta-aminobutyltriethoxysilane, delta-aminobutylethyldiethoxysilane and diethylene triamino propylaminotrimethoxysilane. Preferred are N-beta(aminoethyl)gamma-aminopropyltrimethoxysilane commercially sold as Silquest® A 1120 and diethylene triamino propylaminotrimethoxysilane that is commercially sold as Silquest® A 1130. Both of theses silanes are sold by OSi Specialties, Inc. Danbury, Conn., under respective registered trademarks.

When an amino silane crosslinking agent is used, additional amino functional curing agents, such as, primary, secondary and tertiary amines, that are well known in the art can be added. Typically, aliphatic amines containing a primary amine group, such as, diethylene triamine, and triethylene tetramine can be added. Tertiary amines, such as, tris-(dimethyl aminomethyl)-phenol can also be used.

The coating composition can further comprise one or more pigments. Any pigments suitable for coating can be used.

The coating composition can further comprise one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof. Any additives suitable for coating can be used.

Typical catalysts can include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

Typically, the coating composition can comprise up to 95% by weight, based on the weight of the coating composition, of one or more solvents. The coating composition of this disclosure can have a solid content in a range of from 20% to 80% by weight in one example, in a range of from 50% to 80% by weight in another example and in a range of from 60% to 80% by weight in yet another example, all based on the total weight of the coating composition. The coating composition of this disclosure can also be formulated at 100% solids by using a low molecular weight acrylic resin reactive diluent.

Any typical organic solvents can be used to form the coating composition of this disclosure. Examples of solvents include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

The coating composition should comprise no more than 20% of water and can comprise 0 to 20% of water in one example, 0 to 15% of water in another example, 0 to 10% of water in yet another example, 0 to 5% of water in a further example, and 0 to 2% of water in yet another example.

The coating composition of this disclosure can be utilized as a pigmented coating composition. Conventional inorganic and organic colored pigments, metallic flakes and powders, such as, aluminum flake and aluminum powders; special effects pigments, such as, coated mica flakes, coated aluminum flakes colored pigments, or a combination thereof, can be used. Transparent pigments or pigments having the same refractive index as the cured binder can also be used.

The sag control agent, hereafter referred to as SCA, is typically used to control sagging and therefore improving appearance of a coating.

The sag control agent can be a reaction product of an amine and an isocyanate. The SCA can be produced in the presence or in the absence of one or more acrylic polymers or a binder. One example of a method for producing SCAs can include the one described in U.S. Pat. No. 4,677,028. Microstructures of the SCA can be modified by selecting isocyanates and amine, and synthetic conditions. The SCA can also be made in a way that they are soluble in a polar solvent such as N-methyl pyrrolidone to form a SCA solution. Such SCA solution can be conveniently added directly to a coating to achieve the desired rheology or sag control effect. One example of such SCA solution is commercially available as Byk® 410 from Byk Chemie GmbH, Wesel, Germany, sold under respective registered trademark.

Suitable isocyanates for producing the SCA can include blocked or un-blocked aliphatic, cycloaliphatic, heterocyclo, or aromatic di-, tri- or multivalent isocyanates. Examples of suitable diisocyanates can include 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophoron diisocyanate, the adduct of 1 molecule of 1,4-butanediol and 2 molecules of isophoron diisocyanate, the adduct of 1 molecule of 1,4-butanediol and 2 molecules of hexamethylene diisocyanate, dicyclohexylmethane-4,4'-diisocyanate, xylylene diisocyanate, 1,3,5-trimethyl-2,4-bis(isocyanatomethyl)benzene, toluene diisocyanate, diphenylmethane-4,4'-diisocyanate, adducts of hexamethylene diisocyanate, adducts of isophoron diisocyanate, and adducts of toluene diisocyanate. Isocyanurate-trimers that built up from diisocyantes can also be suitable. A combination of the isocyantes can also be suitable. Any of the isocyanates mentioned in the examples above can be blocked or unblocked.

Amines suitable for the SCA can include primary amines. Examples of primary amines can include benzyl amine, ethylamine, n-propylamine, 2-propylamine, n-butylamine, 2-butylamine, t-butylamine, n-pentylamine, α-methylbutylamine, α-ethylpropylamine, β-ethylbutylamine, hexylamine, octylamine, decylamine, stearylamine, cyclohexylamine, and aniline. A combination of the amines can also be suitable.

In one example, the SCA can consist essentially of a reaction product of an amine and an isocyanate. The isocyanate can be selected from 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophoron diisocyanate, adduct isophoron diisocyanate, adduct of hexamethylene diisocyanate, dicyclohexylmethane-4,4'-diisocyanate, xylylene diisocyanate, 1,3,5-trimethyl-2,4-bis(isocyanatomethyl)benzene, toluene diisocyanate, diphenylmethane-4,4'-diisocyanate, adduct of toluene diisocyanate, or a combination thereof. The amine can be selected from benzyl amine, ethylamine, n-propylamine, 2-propylamine, n-butylamine, 2-butylamine, t-butylamine, n-pentylamine, α-methylbutylamine, α-ethylpropylamine, β-ethylbutylamine, hexylamine, octylamine, decylamine, stearylamine, cyclohexylamine, aniline, or a combination thereof. In one particular example, the amine can be benzyl amine and the isocyanate can be 1,6-hexamethylene diisocyanate.

The SCAs produced by aforementioned process can be typically free from un-reacted iscocyanates since excess amount of amine can be normally used.

Typically, the coating composition of this invention can comprise in a range of from 0.1% to 10% of the SCA, weight percent of the total weight of the binder. The coating composition can comprise in a range of from 0.1% to 10% of the SCA in one example, 0.2% to 8% in another example, 0.2% to 5% in yet another example, weight percent of the total weight of the binder. If a SCA solution such as BYK® 410 is used, polarity of solvent or solvent mix may need to be adjusted according to manufacturer's instruction so the SCA can be dispersed into the coating without separation.

The coating composition of this disclosure can also comprise one or more ultraviolet light stabilizers in the amount of 0.01% to 10% by weight, based on the weight of the coating composition. Examples of such ultraviolet light stabilizers can include ultraviolet light absorbers, screeners, quenchers, and hindered amine light stabilizers. An antioxidant can also be added to the coating composition, in the amount of about 0.01% to 5% by weight, based on the weight of the coating composition.

Typical ultraviolet light stabilizers that are suitable for this disclosure can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals, Tarrytown, N.Y., under respective registered trademark, can be used.

Typical ultraviolet light absorbers that are suitable for this disclosure can include hydroxyphenyl benzotriazoles and derivatives; hydroxyphenyl s-triazines and derivatives; and hydroxybenzophenone U.V. absorbers and derivatives.

Typical antioxidants that are known to or developed by those skilled in the art can be suitable. Examples of commercially available antioxidants can include hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals, under respective registered trademarks.

Typical hindered amine light stabilizers can include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'''-dibutyl-N',N'''-bis(1,2,2,6,6-pentamethyl-4-piperidinyl)], poly-[[6-ϑ1,1,3,3-tetramethylbutylyamino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-2l-oxo-7-oxa-3,20-diazal dispiro(5.1.11.2)henicosan-20-yl)propionate.

The coating compositions of this disclosure can comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered tradmarks, leveling agents based on (meth)acrylic homopolymers; rheological control agents, such as highly disperse silica, fumed silica or polymeric urea compounds; thickeners, such as partially crosslinked polycarboxylic acid or polyurethanes; antifoaming agents; catalysts for the crosslinking reaction of the OH-functional binders, for example, organic metal salts, such as, dibutyltin dilaurate, zinc naphthenate and compounds containing tertiary amino groups, such as, triethylamine, for the crosslinking reaction with polyisocyanates. The additives are used in conventional amounts familiar to those skilled in the art.

The coating compositions according to the disclosure can further contain reactive low molecular weight compounds as reactive diluents that are capable of reacting with the crosslinking agent. For example, low molecular weight polyhydroxyl compounds, such as, ethylene glycol, propylene glycol, trimethylolpropane and 1,6-dihydroxyhexane can be used.

Depending upon the type of crosslinking agent, the coating composition of this disclosure can be formulated as one-pack (1K) or two-pack (2K) coating composition. If polyisocyanates with free isocyanate groups are used as the crosslinking agent, the coating composition can be formulated as a two-pack coating composition in that the crosslinking agent is mixed with other components of the coating composition only shortly before coating application. If blocked polyisocyanates are, for example, used as the crosslinking agent, the coating compositions can be formulated as a one-pack (1K) coating composition. The coating composition can be further adjusted to spray viscosity with organic solvents before being applied as determined by those skilled in the art.

In a typical two-pack coating composition, the two packages can be mixed together shortly before application. The first package typically can contain the polymer having one or more crosslinkable functional groups, and the polytrimethylene ether glycol and, optionally, the pigments. The pigments can be dispersed in the first package using conventional dispersing techniques, for example, ball milling, sand milling, and attritor grinding. The second package can contain the crosslinking agent, such as, a polyisocyanate crosslinking agent, and solvents.

This disclosure is further directed a substrate coated with any of the aforementioned coating compositions. The substrate can be made of metal, plastic or other polymer materials, wood, ceramic, clay, concrete, stone, or other man made or natural materials. The substrate can be a vehicle, such as the aforementioned vehicles or automobiles; home appliance, such as refrigerators, washing machines, dishwashers, microwave ovens, cooking and baking ovens; electronic appliances, such as television sets, computers, electronic game sets, audio and video equipments; recreational equipments, such as bicycles, ski equipments, all terrain vehicles; and home or office furniture, such as tables, file cabinets. The substrate can also have one or more existing coating layers.

The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 18° C. to 35° C., or at elevated temperatures, such as at temperatures in a range of from 35° C. to 150° C. Typical curing temperatures of 20° C. to 80° C., in particular of 20° C. to 60° C., can be used for vehicle repair or refinish coatings.

The coating composition can be applied by conventional techniques, such as, spraying, electrostatic spraying, dipping, brushing, and flow coating. Typically, the coating can be applied to a substrate to form a sag-free coating layer having a wet coating thickness, also known as wet film thickness (wft), in a range of, in one example from 5 to 36 mils (about 127 to 914 microns), in another example from 6 to 36 mils (about 152 to 914 microns), in yet another example from 7 to 36 mils (about 178 to 914 microns), in yet another example from 8 to 36 mils (about 203 to 914 microns), in yet another example from 10 to 36 mils (about 254 to 914 microns), in yet another example from 12 to 36 mils (about 305 to 914 microns), in yet another example from 14 to 36 mils (about 356 to 914 microns), and in yet further example from 16 to 36 mils (about 406 to 914 microns). After curing and drying, dry coating thickness can be typically in a range of from 2 to 20 mils. A dry coating thickness can be 2 to 20 mils in one example, 4 to 20 mils in another example, 6 to 20 mils in yet another example, and 7 to 20 mils in further another example.

The use of high molecular weight polytrimethylene ether glycol with Mn greater than 500 in coating compositions has been described in U.S. Pat. Nos. 6,875,514 and 7,169,475. The coating composition disclosed herein uses polytrimethylene ether glycol having low molecular weight, specifically, having Mn in a range of from 134 to 490.

The coating composition of this invention can include high film build. Some substrates, such as blasted steel, may have certain surface profile with surface unevenness in a range of 1-5 mils. A thin coating with a dry coating thickness of about 1-5 mils may not cover the surface unevenness resulting in uneven coating and unacceptable coating appearance. To form a 5 mil dry coating layer, typically a wet coating layer having a wet coating thickness of 10 mils or more can be needed. As described in aforementioned U.S. Pat. No. 4,677,028, coating compositions typically start to show sagging when a dry coating thickness reaches about 2.2 mils (55 microns) to 3.9 mils (100 microns) even in the presence of sag control agents. To achieve desired total dry film thickness and desired appearance, in a traditional process, multiple coating layers have to be applied in succession wherein each coating layer needs to be dried before a subsequent coating layer can be applied thereon. Sanding may be needed between coatings. Such traditional process requires multiple steps to apply multiple coat layers and can be time consuming leading to low productivity. The coating composition of this invention can be used to directly apply over a metal substrate producing a sag-free coating layer having a dry coating thickness of 6 mils or more. In one example, a sage-free coating layer of 6 mils can be produced by applying a single layer of the coating composition over a substrate. In another example, a sage-free coating layer of 7 mils can be produced by applying a single layer of the coating composition over a substrate. The use of the coating composition of this invention can provide improvement to coating productivity.

This invention is also directed to a process for forming a sag-free coating layer on a substrate. The process can consist of the steps of:
 i) applying the coating composition of this invention over said substrate forming a sag-free wet coating layer having a wet coating thickness in a range of from 10 to 36 mils; and
 ii) curing said sag-free wet coating layer to form said sag-free coating layer.

The sag-free wet coating layer can have a wet coating thickness in a range of from 10 to 36 mils (about 0.25 to 0.91 mm) in one embodiment, 12 to 36 mils (about 0.30 to 0.91 mm) in another embodiment, and 16 to 36 mils (about 0.40 to 0.91 mm) in yet another embodiment. The sag-free coating formed by this invention can have a dry coating thickness in a range of from 2 to 20 mils (about 0.05 to 0.5 mm). The dry coating thickness can be, in one embodiment in a range of from 2 to 20 mils (about 0.05 to 0.5 mm), in another embodiment in a range of 6 to 20 mils (about 0.15 to 0.5 mm) and in yet another embodiment in a range of from 7 to 20 mils (about 0.18 to 0.5 mm).

The sag-free coating layer formed by this invention can have a distinctness of image (DOI) in a range of from 60 to 100 in one embodiment, 70 to 100 in another embodiment, and 80 to 100 in yet another embodiment.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Procedure 1: Preparation of Polytrimethylene Ether Glycol Having Number Average Molecular Weight 250

Twelve kilogram (kg) renewably sourced 1,3-propanediol (PDO) monomers commercially available from DuPont Tate & Lyle Bioproducts, Wilmington, Del., USA, were added to a 20 L glass reactor equipped with a condenser and an agitator. The glass reactor was purged with $N_2$ at the rate 3 L/min. Triflic acid (trifluoromethanesulfonic acid) was added into the reactor to a final concentration of 0.1 wt % and the mixture was heated up to 180° C. with agitation set to 200 RPM to allow the acid-catalyzed polycondensation to proceed. The reaction volatiles were condensed in the condenser and the crude polymer product was retained in the reactor. Crude polymer samples were taken periodically for color and molecular weight analysis. Once the desired Mn was achieved, the polymerization was terminated by turning the heat down. The polymer was neutralized by treating the crude polymer with XUS ion exchange resin, available from Dow Chemical, Midland, Mich., USA, in 2 stages. In the first stage, 2 weight parts of the XUS ion exchange resin and 98 weight parts of the crude polymer were mixed at a temperature of about 105° C. for about 1 hour. In the second stage, an additional 2 weight parts of the XUS ion exchange resin was added to the crude polymer and further mixed for additional 3 hours. Neutralization was conducted under sub-surface nitrogen sparging of 5 L/min and a mixing speed of 200 RPM. The product was filtered to remove the ion exchange resin. Filtration was done at 60° C. Once the product was free of solids, it was dried by heating to about 95° C., with sub-surface nitrogen sparging of about 10 L/min and mixing speed of 150 RPM. An antioxidant, BHT (Butylated hydroxyl toluene), available from Aldrich, St. Louis, Mo., USA, was added to the crude polymer to a final concentration about 200 ppm.

Procedure 2: Fractionation of Polytrimethylene Ether Glycol

To a 500 mL, 3-neck round bottom flask equipped with a mechanical stirrer, a distillation adapter, a condenser and a graduated distillation receiver, 367.6 g of polytrimethylene ether glycol having number average molecular weight of 250 was added. The polymer was heated with a proportional integral derivative (PID) controller connected to a heating mantle and thermocouple. The controller was set to maintain a batch temperature of 50° C. at a power setting of 50% (300 mL-2 L). The flask was fully vacuumed to less than 5 torr, then the controller was turned on, and the reaction was stirred at 200 rpm. The temperature set point and the stirring speed were increased to a maximum of 280 ° C. and 300 rpm, respectively as the distillation progressed. Several fractions were collected, approximately every 20 mL, using the distilling receiver to remove the flask containing the fraction while maintaining the vacuum on the distillation flask. The temperature controller and vacuum pump were turned off after 8 hours and the remaining material was allowed to cool overnight under a blanket of nitrogen.

TABLE 1

Fractionation of polytrimethylene ether glycol.

| | PDO | Dimer | Trimer | Tetramer | Pentamer | Heamer | Heptamer |
|---|---|---|---|---|---|---|---|
| Unfractionated | 2.7% | 15.0% | 20.0% | 22.4% | 18.6% | 15.9% | 3.8% |
| B-1 | 32.9% | 46.5% | 12.7% | 0.9% | — | — | — |
| B-2 | 16.6% | 52.0% | 21.8% | 5.0% | — | — | — |
| B-3 | 4.9% | 52.4% | 31.4% | 8.7% | 0.6% | — | — |
| B-4 | 1.7% | 43.4% | 36.4% | 15.6% | 1.1% | — | — |

TABLE 1-continued

Fractionation of polytrimethylene ether glycol.

| | PDO | Dimer | Trimer | Tetramer | Pentamer | Hexamer | Heptamer |
|---|---|---|---|---|---|---|---|
| B-5 | 0.5% | 37.4% | 40.4% | 18.4% | 1.8% | — | — |
| B-6 | — | 27.9% | 44.1% | 23.4% | 3.2% | — | — |
| B-7 | — | 17.2% | 44.0% | 30.9% | 6.7% | — | — |
| B-8 | — | 9.7% | 42.8% | 36.5% | 9.7% | — | — |
| B-9 | — | 2.0% | 41.8% | 42.0% | 12.8% | — | — |
| B-10 | — | — | 30.5% | 46.0% | 19.8% | 2.3% | — |
| B-11 | — | — | 18.9% | 48.1% | 26.9% | 5.3% | — |
| B-12 | — | — | 10.6% | 49.5% | 32.3% | 7.0% | — |
| B-13 | — | — | 3.9% | 47.7% | 38.5% | 9.4% | — |
| B-14 | — | — | 0.6% | 41.6% | 45.0% | 12.2% | — |
| B-15 | — | — | — | 28.7% | 49.7% | 20.4% | 0.7% |
| B-16 | — | — | — | 17.0% | 51.4% | 27.6% | 2.0% |

The fractions were analyzed by GC-MS and concentrations of oligomers present in unfractionated and fractionated polytrimethylene ether glycol are reported in Table 1.

Calculated number average molecular weights (Mn) for the polytrimethylene ether glycol are shown in Table 2.

TABLE 2

Number average molecular weight (Mn).

| Polytrimethylene ether glycol | Calculated Mn |
|---|---|
| Dimer | 134 |
| Trimer | 192 |
| Tetramer | 250 |
| Pentamer | 308 |
| Hexamer | 366 |
| Heptamer | 424 |

Coating Compositions

Coating compositions are prepared according to Table 3. The coating composition can be allied over a vehicle, a part of a vehicle, or other substrate or testing substrate. One testing substrate can be the blasted steel that are available from East Coast Steel Inc, Columbia, S.C. 29290, USA.

TABLE 3

Coating Compositions (in weight part).

| | Example 1 | Example 2 | Example 3 | Example 4 |
|---|---|---|---|---|
| Low Tg Acrylic polymer [1] | — | 18 | — | 18 |
| High Tg Acrylic polymer [2] | 63.0 (45) | — | 63.0 (45) | — |
| Low Tg acrylic polymer Joncryl 924 [3] | — | 45 | — | 45 |
| Unfractionated Polytrimethylene ether glycols [4] | 10.0 | 10.0 | — | — |
| Fractionated Polytrimethylene ether glycols [5] | — | — | 6.0 | 6.0 |
| SCA [6] | 1.36 | 1.36 | 1.36 | 1.36 |
| Tertiary butyl acetate | 5.0 | 5.0 | 5.0 | 5.0 |
| p-Chlorobenzotrifluoride | 14.0 | 14.0 | 14.0 | 14.0 |
| 2-Ethyl Hexyl Acetate | 0.8 | 0.8 | 0.8 | 0.8 |
| Tint [7] | 80.6 | 80.6 | 80.6 | 80.6 |
| Isocyanates crosslinking agent (Desmodur-N3330) [8] | 18.88 | 18.88 | 18.88 | 18.88 |
| Total | 193.64 | 193.64 | 189.64 | 189.64 |

[1] and [2] Low Tg Acrylic polymer and High Tg acrylic polymer are as described in U.S. Patent Publication No.: 2010-0004365, filed on Jun. 23, 2009. The amounts shown in parentheses represent the amount of the polymer for preparing the SCA as described.
[3] Low Tg acrylic Joncryl 924, Tg = −5° C., available from BASF Resins, Sturtevant, WI, USA. Joncryl 924 is mixed with the SCA during the SCA synthesis as described in U.S. Patent Publication No.: 2010-0004365.
[4] Polytrimethylene ether glycols are prepared in Procedure 1 without fractionation.
[5] The fractionated polytrimethylene ether glycol is the B-3 fraction from Procedure 2.
[6] SCA (sag control agent) is produced according to U.S. Patent Publication No.: 2010-0004365.
[7] Tint: The tint is 725P ™ which is a green Imron ® Tint available from E. I. DuPont de Nemours and Company, Wilmington, DE, USA, under respective trademark or registered trademark.
[8] Desmodur ® N3300: aliphatic polyisocyanate HDI trimer, available from Bayer MaterialScience, Pittsburgh, PA, USA, under respective registered trademark.

What is claimed is:

1. A coating composition comprising a binder consisting essentially of:
   A) a crosslinkable component consisting essentially a polymer having one or more crosslinkable functional groups;
   B) a polytrimethylene ether glycol having a Mn (number average molecular weight) in a range of from 134 to 490, wherein said Mn is based on all polytrimethylene ether glycol in said binder;
   C) a sag control agent; and
   D) a crosslinking component consisting essentially of at least one crosslinking agent having one or more crosslinking functional groups;
   wherein said polytrimethylene ether glycol is fractionated and free from hexamers and heptamers of 1,3-propanediol.

2. The coating composition of claim 1, wherein the polytrimethylene ether glycol is polymerized from bio-derived 1,3-propanediol.

3. The coating composition of claim 1, wherein the polytrimethylene ether glycol has in a range of from 10% to 100% of dimers, percentage based on the total weight of the polytrimethylene ether glycol.

4. The coating composition of claim 1, wherein at least one of said one or more crosslinkable functional groups is hydroxyl group, and wherein at least one of said one or more crosslinking functional groups is isocyanate group.

5. The coating composition of claim 1, wherein said sag control agent consists essentially of a reaction product of an amine and an isocyanate.

6. The coating composition of claim 5, wherein said isocyanate is selected from 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophoron diisocyanate, adduct isophoron diisocyanate, adduct of hexamethylene diisocyanate, dicyclohexylmethane-4,4'-diisocyanate, xylylene diisocyanate, 1,3,5-trimethyl-2,4-bis(isocyanatomethyl)benzene, toluene diisocyanate, diphenylmethane-4,4'-diisocyanate, adduct of toluene diisocyanate, or a combination thereof.

7. The coating composition of claim 5, wherein said amine is selected from benzyl amine, ethylamine, n-propylamine, 2-propylamine, n-butylamine, 2-butylamine, t-butylamine, n-pentylamine, α-methylbutylamine, α-ethylpropylamine, β-ethylbutylamine, hexylamine, octylamine, decylamine, stearylamine, cyclohexylamine, aniline, or a combination thereof.

8. The coating composition of claim 5, wherein said amine is benzyl amine and said isocyanate is 1,6-hexamethylene diisocyanate.

9. The coating composition of claim 1 further comprising one or more pigments, one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof.

10. A substrate coated with the coating composition of claim 1, 2, 3, 4, 5, 6, 7, 8, or 9.

11. A process for forming a sag-free coating layer over a substrate, said process comprising the steps of:
   i) applying the coating composition of claim 1 over said substrate forming a sag-free wet coating layer having a wet coating thickness in a range of from 10 to 36 mils; and
   ii) curing said sag-free wet coating layer to form said sag-free coating layer.

12. The coating composition of claim 1, wherein, when applied over a substrate, said coating composition forms a sag-free dry coating layer having a dry coating thickness in a range of from 0.15 to 0.5 mm.

13. The coating composition of claim 12, wherein said sag-free dry coating layer has a distinctness of image in a range of from 60 to 100.

14. The coating composition of claim 1, wherein, when applied over a substrate, said coating composition forms a sag-free wet coating layer having a wet coating thickness in a range of from 10 to 36 mils.

* * * * *